United States Patent [19]

Reinhardt et al.

[11] 4,242,391
[45] Dec. 30, 1980

[54] NOISE BARRIER PAD AND THE METHOD FOR THE PRODUCTION OF SAME

[75] Inventors: Hans Reinhardt, Hirschberg; Manfred Schmahl, Worms; Armin Tritsch, Weinheim, all of Fed. Rep. of Germany

[73] Assignee: Carl Freudenberg, Weinhein, Fed. Rep. of Germany

[21] Appl. No.: 915,095

[22] Filed: Jun. 13, 1978

[30] Foreign Application Priority Data

Jun. 16, 1977 [DE] Fed. Rep. of Germany ....... 2727299

[51] Int. Cl.³ .................... B32B 5/20; B32B 27/06; B29D 27/04
[52] U.S. Cl. .................... 428/76; 181/284; 181/288; 181/294; 181/DIG. 1; 264/46.4; 264/255; 264/271; 428/160; 428/310; 428/315
[58] Field of Search .................... 264/46.4, 255, 271; 181/200, 204, 292, 284, 211, DIG.1, 288, 294; 428/160, 310, 315, 76

[56] References Cited

U.S. PATENT DOCUMENTS

| | | | |
|---|---|---|---|
| 2,845,997 | 8/1958 | Waite | 264/46.4 X |
| 3,534,129 | 10/1970 | Bartel | 264/46.4 |
| 3,534,828 | 10/1970 | Iver et al. | 181/204 |
| 3,762,489 | 10/1973 | Proksch et al. | 181/204 X |
| 3,796,277 | 3/1974 | Gordon | 181/204 X |
| 3,840,627 | 10/1974 | Rhodes | 264/46.4 |
| 4,120,376 | 10/1978 | Palmer | 181/204 |

FOREIGN PATENT DOCUMENTS

| | | | |
|---|---|---|---|
| 2658379 | 6/1978 | Fed. Rep. of Germany | 181/284 |
| 2653896 | 7/1978 | Fed. Rep. of Germany | 181/292 |
| 750239 | 6/1956 | United Kingdom | 181/292 |

Primary Examiner—Philip Anderson
Attorney, Agent, or Firm—Sprung, Felfe, Horn, Lynch & Kramer

[57] ABSTRACT

A noise barrier pad and a method for the production of same comprises the steps of forming a tread layer by reacting a mixture for polyurethane foam in a hollow mold having separable upper and lower parts and which is shaped so as to form the tread layer, curing the foam, removing the upper part of the mold, placing a blank of noise barrier material on the surface of the foam which corresponds to the bottom side of the tread layer, and forming a bottom foam layer on the tread layer and barrier material by placing another upper mold constructed in accordance with the bottom layer of the noise barrier pad and defining a cavity over the tread layer and barrier material and filling the cavity with the reaction mixture for the polyurethane foam.

2 Claims, 2 Drawing Figures

NOISE BARRIER PAD AND THE METHOD FOR THE PRODUCTION OF SAME

BACKGROUND

The invention relates to a noise barrier pad and the method of manufacturing same for industrial vehicles.

The driver of an industrial vehicle, which as a farm machine for example, is often exposed to exceedingly great noise, which in some cases can be hazardous to his health. In the effort to provide him with working conditions which are satisfactory in this regard, a number of measures have become known, of which the fully enclosed cab is probably the most promising. However, difficulties are created by the fact that, due to the need to bring numerous control levers through the enclosure, it is not possible to exclude entirely the penetration of outside noise, and by the fact that, on the other hand, an acoustical resonant cavity is created between the large glass surfaces which are necessarily involved, which makes it largely impossible to damp out sound waves after they have entered the cavity.

It has already been proposed to provide sound absorbing pads in the roof area or on the unglazed portions of the walls of the cab. However, due to the numerous openings provided for the admission of control levers, and to the fact that the materials are easily harmed by dirt, such pads cannot be used in the lower part of such cabs where the transmission of noise is particularly intense. These areas are therefore generally left unpadded. The effective noise level that has hitherto been achieved is consequently generally close to the maximum limit specified by the trade unions.

THE INVENTION

The invention is addressed to the problem of developing a method for the production of a noise barrier pad for industrial vehicles which in a simple manner will permit the production of a contoured, compact noise barrier pad for covering the floors of such vehicles. The pad is to be wear-resistant, easy to clean, and impervious to moisture and dirt, and at the same time it must level out irregularities on the floor of the vehicle.

This problem is solved in accordance with the invention by a method of producing a noise barrier pad for industrial vehicles, characterized by the fact that a reaction mixture for a polyurethane foam is placed in a hollow mold designed to the shape of the tread layer of the noise barrier pad that after the foam is cured and the upper part of the mold is removed, a piece cut from a sheet of a noise barrier material is applied to the bottom side of the tread layer, and that, after an additional top mold shaped to correspond to the bottom layer has been set in place, the cavity newly formed by the latter is filled with polyurethane foam.

In a special embodiment, provision is made for the cut piece of sheet material to be completely enveloped by the polyurethane foam in a sound barrier pad made by the method of the invention. The use of heavy spar has proven excellent for the production of the cut piece.

It is particularly desirable for the polyurethane foam forming the tread layer to have a greater specific weight than the polyurethane foam forming the bottom layer. Polyurethane foams having a specific weight of about 600 to 1100 kilograms per cubic meter have proven to be especially suitable for use in the tread layer. The specific weight of the polyurethane foam used in making the bottom layer, however, preferably ranges between about 150 and 600 kg/m$^3$.

BRIEF DESCRIPTION OF THE DRAWING

These features, objects and advantages of the invention will become apparent from the following specification when read in connection with the accompanying drawing in which.

DETAILED DESCRIPTION OF THE INVENTION

Figure 1:
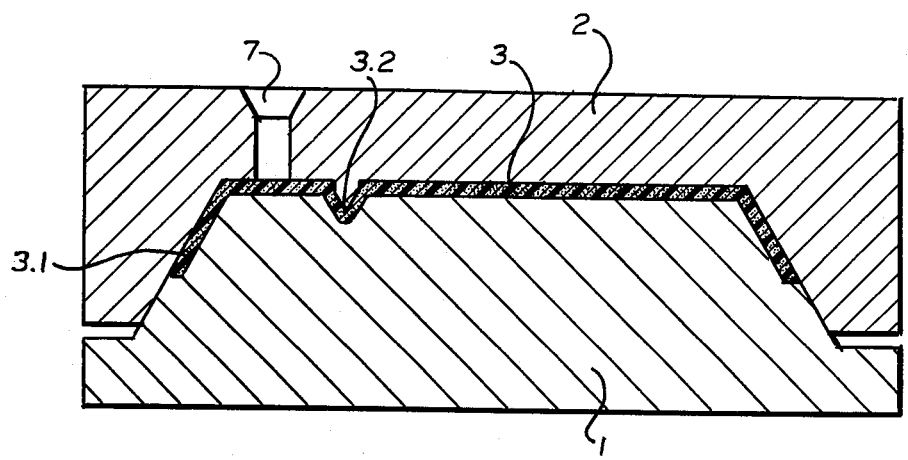
FIG. 1 is a cross-sectional view of one step in the process of the present invention.
Figure 2:
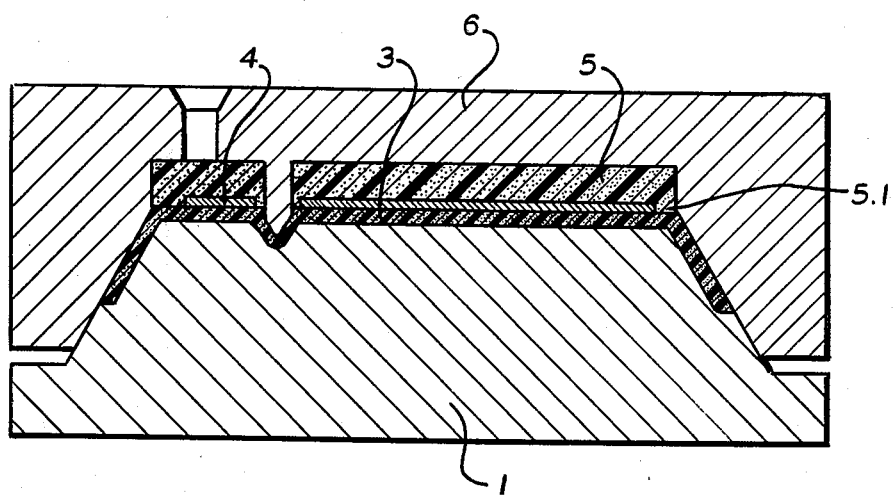
FIG. 2 is a cross-sectional view of another step in the process of the present invention.

Referring now to FIGS. 1 and 2, a hollow mold comprising a bottom part 1 and a top part 2 has the hollow portion thereof designed to conform to the shape of the tread layer of the noise barrier pad. Foam is introduced into the mold through opening 7 and after that the foam is cured to form the tread layer 3. The surface of tread layer 3 which afterwards forms the visible surface therof is, in this casting process, facing downward. It is therefore possible to adapt the surface to special requirements as regards its shape, and, for example, provide dirt deflectors 3.1 in the marginal areas. It is likewise possible to provide pedal openings 3.2 at other points wherever they are desired.

Upon completion of the foaming of the reaction mixture, the top part 2 of the mold is removed, and a correspondingly prepared piece 4 of the selected sound barrier material, which is for example a heavy spar, cut from a sheer of same, is placed on the thus exposed bottom face of the tread layer 3.

Depending on particular requirements, it may be desirable to cement this piece to the tread layer 3 or to interpose a thermally activatable adhesive. In most cases, however, such measures are not desired, because when the piece is pressed against the bottom side of the tread layer great contact is developed which, in conjunction with the marginal foaming 5.1, will assure a sufficiently reliable bond. This results in an improved sound absorbtion.

The open mold is then reclosed by the superimposition of another top mold 6. The cavity now formed by this mold is then again filled with a reaction mixture for the formation of a polyurethane foam. Immediately after the foam has set, the entire combined structure can be removed from the mold and put to use.

The sound barrier pad of the invention is characterized especially by the fact that it can be adapted, due to the special way in which it is made, to the most complex contours of the floors of the vehicles. It is extraordinarily resistant to mechanical damage, easy to clean, and impervious to dirt and moisture. The advantage achieved by its use consists also and above all in the fact that, due to its specific construction, it is neutral to vibration. It thus contributes to a very special degree to a reduction of the noise level in the driver's cabs of such vehicles.

It will be appreciated that the instant specification and claims are set forth by way of illustration and not limitation, and that various modifications and changes may be made without departing from the spirit and scope of the present invention.

We claim:

1. A process for producing a noise barrier pad for industrial vehicles, comprising forming a shaped tread layer by reacting a mixture for a polyurethane foam having a density of about 600–1100 kg/m$^3$ in a hollow mold having separable upper and lower parts and which is shaped so as to form the tread layer; removing the upper mold part; placing a blank of noise barrier material comprising a heavy spar layer on a portion of the bottom side of the tread layer; placing over the lower mold part a second upper mold part so as to define with the lower mold part, tread layer and spar layer a cavity; and filling the cavity with a reaction mixture to form therein a bottom layer of polyurethane foam having a density of about 150–600 kg/m$^3$, the bottom layer in conjunction with the tread layer encapsulating the spar sheet and thereby fixing it in position.

2. A noise barrier pad produced by the method of claim 1.

* * * * *